United States Patent [19]

Yokoyama et al.

[11] Patent Number: 5,012,781

[45] Date of Patent: May 7, 1991

[54] GAS ENGINE

[75] Inventors: Yoshiharu Yokoyama; Shigeru Akiyama; Hironori Nakayama; Tsuyoshi Kamiya, all of Iwata, Japan

[73] Assignee: Yamaha Hatsudoki Kabushiki Kaisha, Iwata, Japan

[21] Appl. No.: 377,419

[22] Filed: Jul. 10, 1989

[30] Foreign Application Priority Data

Jul. 11, 1988 [JP] Japan ................. 63-170866

[51] Int. Cl.$^5$ .................. F02D 19/02; F02D 31/00
[52] U.S. Cl. ................... 123/353; 123/527
[58] Field of Search ......... 123/27 GE, 319, 350, 123/351, 352, 353, 525, 526, 527

[56] References Cited

U.S. PATENT DOCUMENTS

| 3,186,393 | 6/1965 | Neil | 123/527 |
|---|---|---|---|
| 4,098,248 | 7/1978 | Todd | 123/527 |
| 4,445,467 | 5/1984 | Westerman et al. | 123/193 H X |
| 4,513,728 | 4/1985 | Ullman et al. | 123/527 |
| 4,545,345 | 10/1985 | Pagdin et al. | 123/527 X |
| 4,603,674 | 8/1986 | Tanaka | 123/27 GE X |
| 4,858,583 | 8/1989 | Sonntag | 123/527 |

FOREIGN PATENT DOCUMENTS

| 126456 | 7/1983 | Japan | 123/527 |
|---|---|---|---|
| 175741 | 9/1985 | Japan | 123/27 GE |
| 175743 | 9/1985 | Japan | 123/27 GE |
| 2136499 | 9/1984 | United Kingdom | 123/27 GE |

Primary Examiner—Tony M. Argenbright
Attorney, Agent, or Firm—Ernest A. Beutler

[57] ABSTRACT

A small portable generator powered by a gas fueled internal combustion engine. The gas fuel supply system for the engine includes a solenoid value whose duty cycle is regulated so as to permit unthrottled operation of the engine and afford engine speed control.

9 Claims, 5 Drawing Sheets

GAS ENGINE

BACKGROUND OF THE INVENTION

This invention relates to a gas powered internal combustion engine and more particularly to an improved speed regulator for such engines.

There are many instances where it is desirable to employ an extremely small internal combustion engine as a power source. In addition, the operation of such engines on a pressurized gaseous fuel (LPG) has a number of advantages. However, when an extremely small engine is provided, it is desirable so as to insure that the engine can be quite simple and yet that its speed can be controlled accurately. Conventional engines embody some form of governor mechanism for maintaining the engine speed. However, when extremely small engines are provided, for example, engines having a displacement of only 20 cc, such governor mechanisms are not at all practical.

It is, therefore, a principal object of this invention to provide an improved and simple arrangement for maintaining the engine speed of a gaseous fueled engine.

It is a further object of this invention to provide an improved fuel control for a gaseous fueled internal combustion engine.

SUMMARY OF THE INVENTION

This invention is adapted to be embodied in an engine speed control for a small, gas fueled, internal combustion engine comprising a source of fuel and conduit means for supplying fuel from the fuel source to the engine. Valve means are incorporated in the conduit means and are movable between an opened and a closed position. Means cyclically vary the valve between its opened and closed positions with a duty cycle that is variable to control the amount of fuel supplied to the engine.

DETAILED DESCRIPTION OF THE PREFERRED EMBODIMENTS

Figure 1:
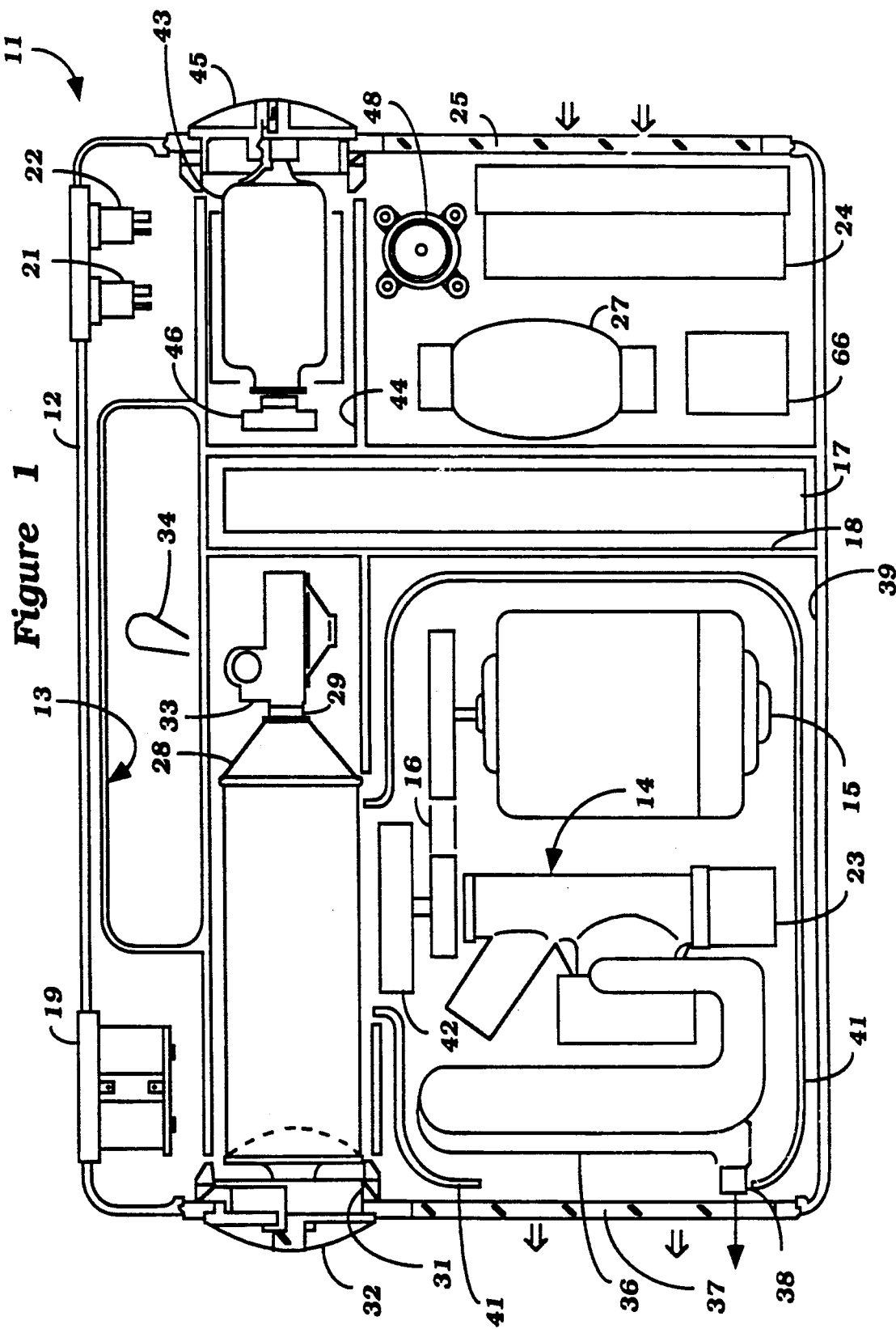
FIG. 1 is a cross-sectional view taken through a portable power supply constructed in accordance with an embodiment of the invention.
Figure 2:
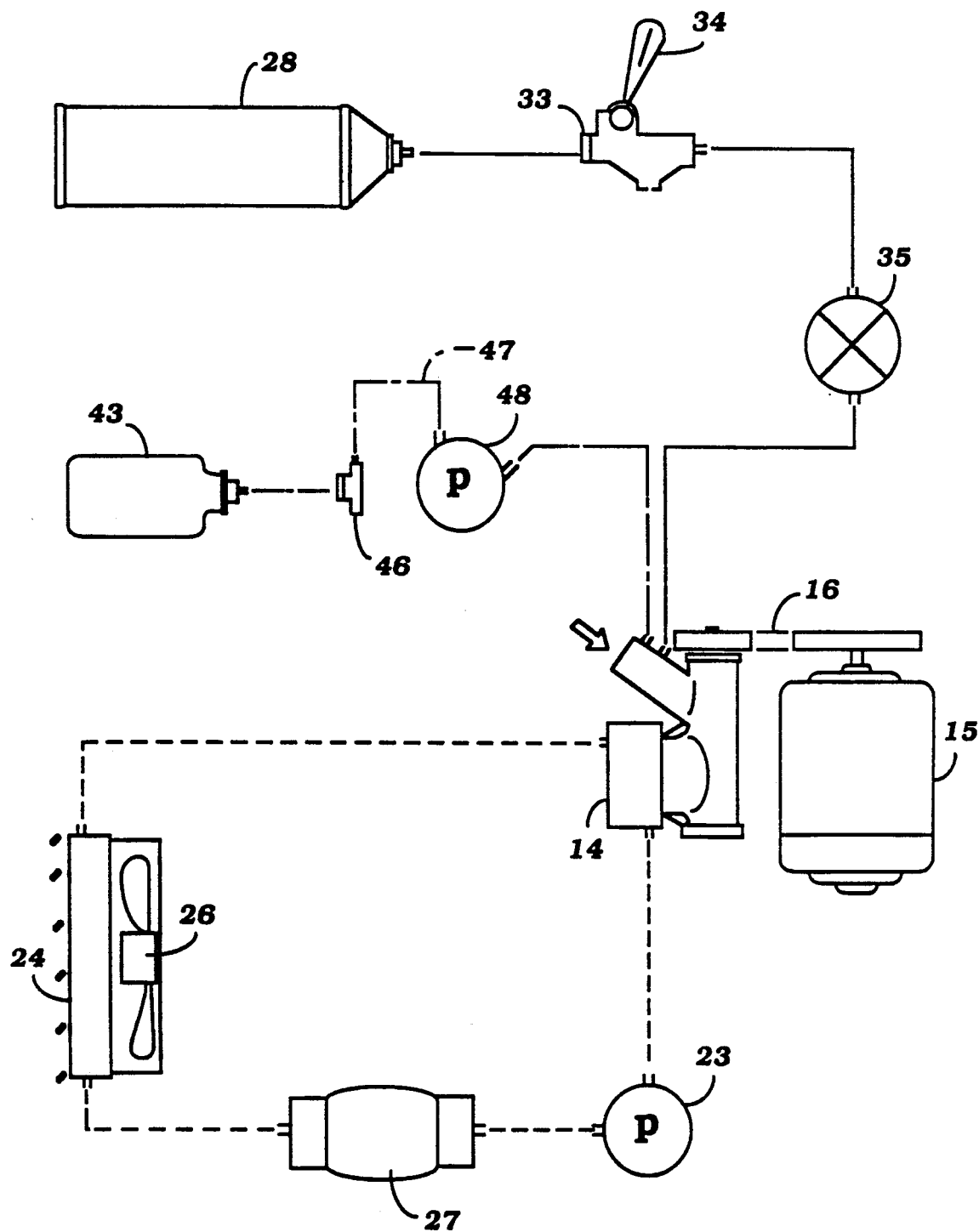
FIG. 2 is a partially schematic view showing the components of the power suppy and their interrelationship.

Referring first primarily to FIGS. 1 and 2, a compact portable electric power supply constructed in accordance with an embodiment of the invention is identified generally by the reference numeral 11. The invention is described in conjunction with a portable power supply since such devices advantageously run on LPG fuel. However, it is to be understood that the invention can be utilized in other applications wherein an internal combustion engine is supplied with a liquefied gaseous fuel and the fuel is supplied to the engine in gaseous form.

The power unit 11 is comprised of an outer housing, indicated generally by the reference numeral 12, and which contains all of the components of the power supply. The outer housing 12 may be formed from any suitable material such as a molded plastic and is formed with a carrying handle 13 formed by an opening at its upper end.

Contained with the outer housing 12 is a single cylinder, liquid cooled, small displacement internal combustion engine, indicated generally by the reference numeral 14. In the illustrated embodiment, the engine 14 is operated under the two-stroke, crankcase compression principle, however, it should be readily apparent to those skilled in the art that the engine 14 may be a four-stroke cycle engine and may have other than a single cylinder and, in fact, may be a rotary or other type of engine than a reciprocating engine.

The engine 14 has its output shaft connected to a shaft of a combined starter and generator 15 by means of a driving belt 16. The starter, generator 15 is coupled with an electrical circuit that includes a vertically positioned battery 17 contained within a compartment 18 formed by the outer housing 12. This circuit permits the starter, generator 15 to operate as a starter so as to start the engine 14. Once the engine 14 commences running, the starter, generator 15 will operate as a generator and supply a charge to the battery 17 and also provide an electrical output to a receptacle 19 carried adjacent the handle 13 so as to permit an electrical device to be plugged in and powered by the unit 11.

There is provided adjacent the handle 13 on the side opposite the receptacle 19 a main control switch 21 for switching the power on and off and a starter switch 22 for operating the starter, generator 15 in its starter mode.

The engine 14 is further provided with a cooling system that includes a coolant pump 23 that is driven by the engine 14 and which circulates coolant through a cooling jacket of the engine and a heat exchanging radiator 24. The radiator 24 is juxtaposed to an air inlet opening 25 formed at one side of the housing 12. There is further provided an electric fan 26 that is powered by the battery 17 and which circulates the air across the core of the radiator 24. The cooling system also includes an accumulator type pressure control device 27 which is comprised generally of an expansible hose section so as to compensate for volume differences in the coolant of the engine 14 as occur during engine operation.

The engine 14 is fueled by a pressurized source of gaseous fuel (LPG) that is contained within a removable container 28 that is detachably connected to a receptacle 29 immediately beneath the handle portion 13. The container 28 is placed into the receptacle 29 through an opening 31 formed at one side of the housing 12 and which opening is normally closed by a closure plug 32.

The receptacle 29 is coupled to a main shutoff valve 33 having a control handle 34 so as to permit the supply of fuel from the container 28 to be shut off from the remainder of the fuel supply circuit for the engine when the power supply 11 is not being utilized.

A conduit connects the main shutoff valve 33 with a duty solenoid valve 35 which controls the flow of fuel to the induction system of the engine 14 in a manner to be described.

The engine 14 further includes an exhaust system that is comprised of a muffler 36 that is juxtaposed to an air outlet opening 37 which is formed at the side of the housing 12 opposite to the inlet opening 25. Air which has passed across the engine will then exit from the air outlet opening 37 so as to cool the muffler 36. The muffler 36 also has a discharge opening 38 which registers with the opening 37 for discharge of exhaust gases from within the housing 12.

The engine 14 and generator 15 are contained within a main cavity 39 formed by the outer housing 22 and are surrounded by a protective shield 41 for further heat insulation and ducting. An engine driven fan 42 circulates air from within the housing 12 across the engine 14, muffler 36 and out the opening 37.

The engine 14 is also provided with a lubricating system that receives lubricant from a separate lubricant container 43 that is received within a compartment 44 formed in the outer housing 12 and which is closed by a removable closure plug 45. The lubricant container 43 is of the cartridge type and is connected to a receiver 46 that supplies lubricant to the engine induction system through a conduit, shown schematically at 47 and in which a lubricant control pump 48 is positioned having a construction as described in copending application entitled "Compact Power Supply And Lubricant Affording Device Therefore", Ser. No. 377,480, filed July 10, 1989, and assigned to the assignee of this application. The lubricant pump 48 is designed so as to provide a positive flow of lubricant and also will in effect close the conduit 47 when the engine is not running so that lubricant cannot inadvertently flow from the reservoir 43 to the engine 14. The pump 48 also meters a very small amount of lubricant so as to insure very good lubrication for the engine under all running conditions and to avoid excess lubricant flow and consumption.

Figure 3:
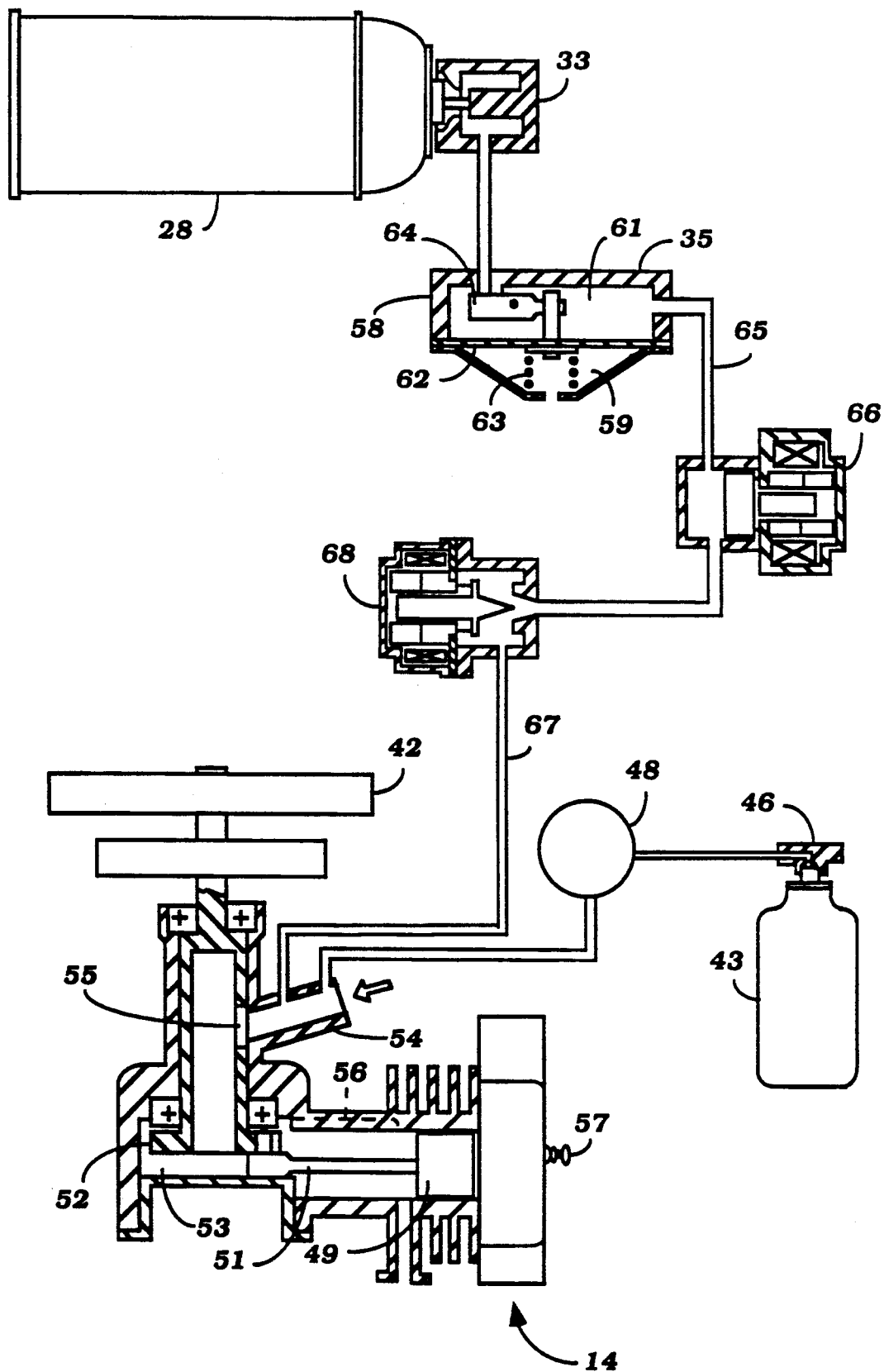
FIG. 3 is a schematic view, in part similar to FIG. 2, with portions shown in cross-section and shows more details of the fuel feed system and lubricant feed system for the engine.

FIG. 3 shows in more detail the fuel supply system for the engine 14 and also some details of the construction of the engine 14. Referring now to this figure, it will be seen that the engine 14 is of the single cylinder, crankcase compression type and includes a single reciprocating piston 49 that is connected by means of a connecting rod 51 to a crankshaft 52. The engine is provided with a crankcase chamber 53 to which a fuel/air charge is introduced by means of an air inlet passageway 54 that communicates with the crankcase chamber 53 by means of a rotary valve 55. The fuel/air which is delivered to the crankcase chamber 53 is transferred to the area above the head of the piston 49 through a transfer or scavenge passage 56 for combustion. During cold starting, this combustion is initiated by means of a glow plug 57 that is supported in the cylinder head of the engine and which is powered in a known manner. The glow plug 57 is continuously operated after the engine has started but at a reduced current so as to prolong the life of the glow plug 57, this being accomplished in a manner to be described.

Referring now specifically to the fuel delivery system, it should be noted that the fuel pressure regulator 35 is comprised of an outer housing 58 that is divided into an atmospheric chamber 59 and a fuel pressure chamber 61 by means of a diaphragm 62. The diaphragm 62 is also biased by means of a spring 63 contained within the atmospheric chamber 59 and operates a valve element 64 so as to maintain a constant gas pressure to a conduit 65. The conduit 65 has positioned within it a solenoid operated valve 66, which is cycled in a manner to be described, so as to provide a variable fuel flow to the engine to maintain a constant speed. A conduit 67 interconnects the solenoid valve 66 with the intake passageway 54 and it will be noted that there is no throttle valve in the intake passageway 54. Therefore, the speed of the engine 14 is controlled by varying the duty cycle of the solenoid valve 66 in a manner as will be described.

In addition, a further throttle valve 68 is provided in the conduit 67 and is solenoid operated so as to provide further fuel control depending upon the density of the fuel so as to insure against an overly rich mixture under some running conditions. This is primarily operative at low engine speeds so as to control prevent against too rich a mixture being generated in the induction system.

It should also be noted that the fuel pressure regulator 35 maintains a slightly greater than atmospheric fuel pressure.

The lubricant from the reservoir 43 is also discharged into the intake passageway 54 for lubrication of the engine in a known manner.

Figure 4:
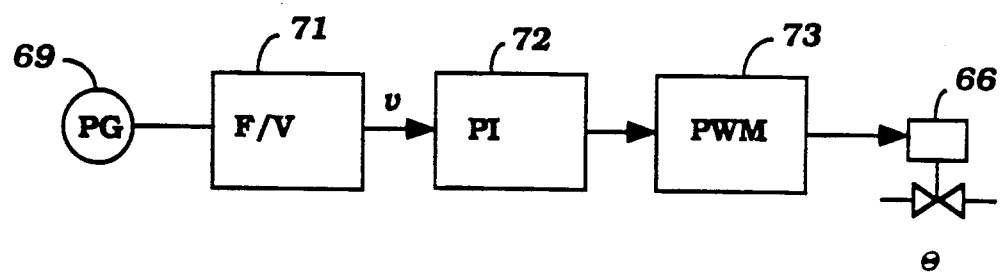
FIG. 4 is a diagrammatic view showing the control circuit for the fuel controlling solenoid.
Figure 5:
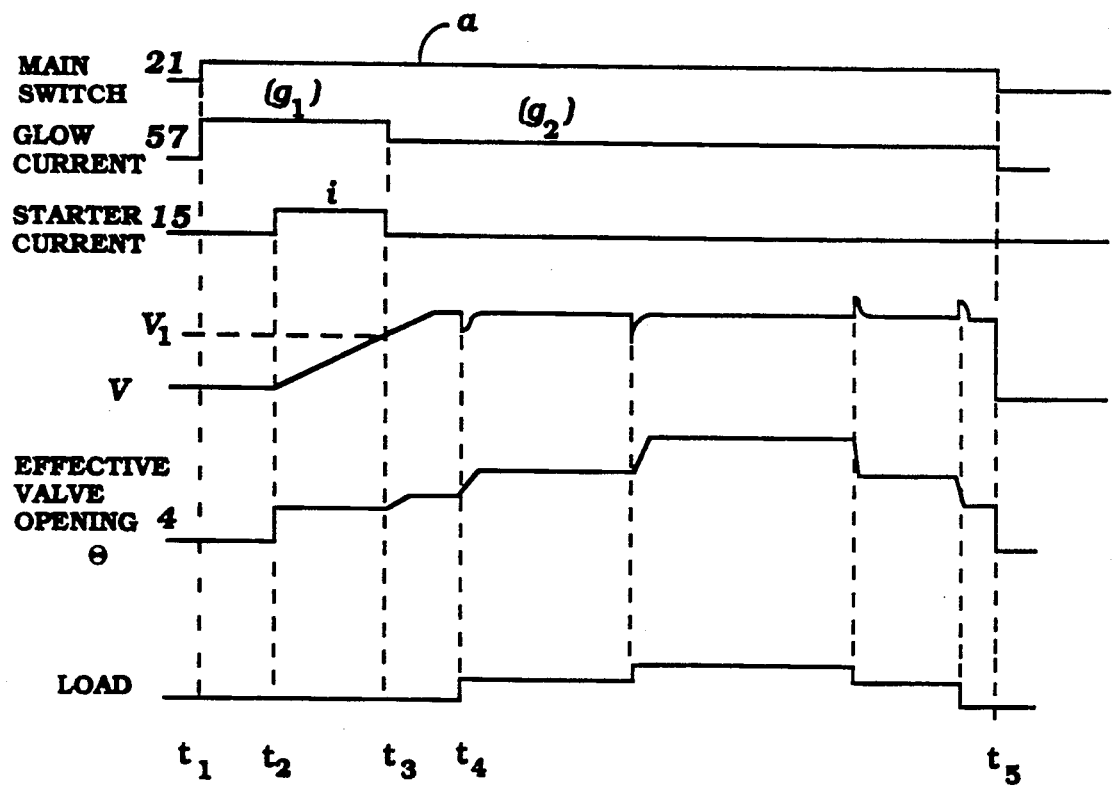
FIG. 5 is a graphical view showing the various conditions during the control operation.

Referring now in detail to FIGS. 4 and 5, the method by which the valve 66 is controlled so as to vary the fuel flow and engine speed will be described. In addition, the operation of the starter motor and glow plug 57 will also be described by reference to these figures. As may be seen in FIG. 4, the engine 14 is provided with a pulse generator (PG) 69 that provides an output pulse signal to a frequency-to-voltage converter 71 which speed signal indicates the actual rotational speed of the crankshaft 52. The frequency-to-voltage generator 71 converts the pulse signal to a voltage signal V that is inputted to a fuel supply controller 72 that varies the fuel supplied to the engine by outputting a signal to a pulse width modulator 73 that varies the duty cycle of the solenoid 66.

Referring now to FIG. 5, the effective valve opening $\theta$ of the solenoid valve 66 is depicted in relation to load and operation of the starter main switch and starter. In addition, the current supplied to the glow plug 57 is also depicted. When the main switch 21 is turned on and the starter switch 22 is energized at the point $t_1$, the main switch current will rise to the on level as shown and the glow plug will be supplied with current at an elevated level $g_1$ so as to provide the necessary heat for starting. After a certain time delay as indicated by the point $t_2$, the current to the starter 15 will be raised to the level i and the engine will be cranked. The cranking speed continues until the speed reaches the speed indicated by the voltage $v_1$ at the point in time $t_3$. At this time, it is determined that the engine is running and the starter, generator 15 then converts to a generator output and the current to the starter is discontinued. At this same time, the glow plug current is reduced to a lower level $g_2$ and the glow plug will be heated at a slower rate. As has been noted, this prolongs the life of the glow plug 57.

When the starter current was energized at the point $t_2$, the valve 66 was then begun on its duty cycle and was opened to the starting condition. When the starter current was discontinued at the point $t_3$, the effective valve opening $\theta$ was continued to increase and will increase until the engine speed reaches it desired speed. This occurs some time after the point $t_3$.

During the engine running, if the load on the engine increases, as at the point $t_4$, the engine will tend to slow down and the voltage signal V will decrease. When this happens, the controller 72 increases the output for the pulse width modulator 73 so as to increase the duty cycle of the solenoid valve 66 so as to maintain the constant engine speed. At subsequent load increases, the same will happen. In a like manner, if the load decreases, the voltage signal V will increase and the duty cycle of the solenoid valve 66 is decreased by the controller 72 so as to maintain speed. At a point when the main switch is turned off $t_5$, the glow current will be discontinued and the valve 66 will be shut off so as to stop the engine.

Figure 6:
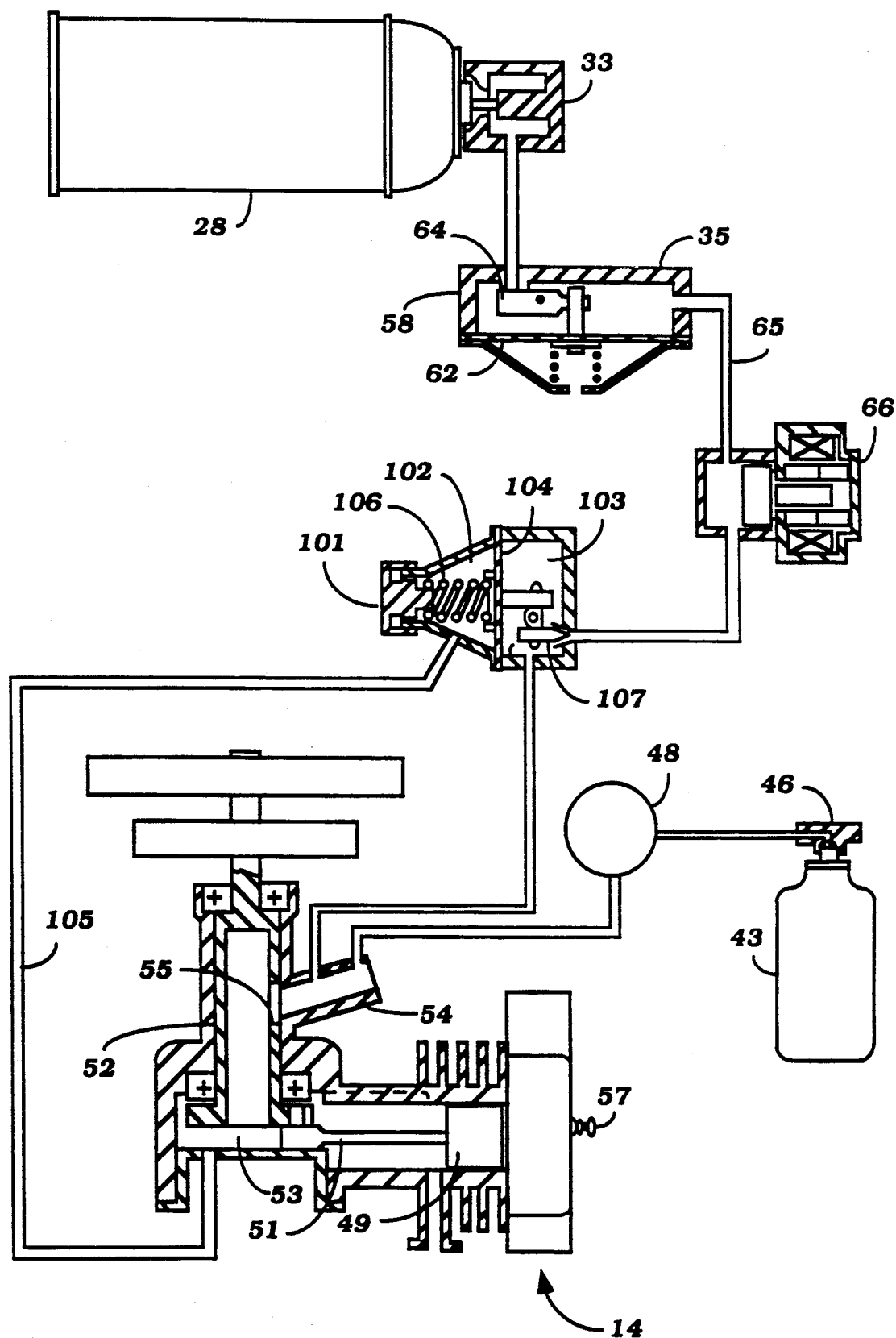
FIG. 6 is a diagrammatic view, in part similar to FIG. 3, showing another embodiment of the invention.

In the embodiment of FIGS. 3 through 5, the valve 68 was a proportional solenoid valve that was operated electrically. FIG. 6 shows another embodiment of the invention wherein the solenoid valve 68 is replaced by a pressure regulating valve 101. The pressure regulator valve 101 is provided with a crankcase pressure chamber 102 and a fuel pressure chamber 103 separated by a diaphragm 104. The crankcase pressure chamber 102 receives pressure in the crankcase chamber 53 via a conduit 105 and a coil compression spring 106 is contained within the chamber 102. The diaphragm 104 is operatively connected to a flow controlling valve 107 so as to avoid overrichness at low speeds.

It should be readily apparent from the foregoing description that the described embodiments of the invention are effective in providing a very simple speed control for a gas powered engine without requiring a mechanical governor or throttle valve. Although two embodiments of the invention have been illustrated and described, various changes and modifications may be made without departing from the spirit and scope of the invention, as defined by the appended claims.

We claim:

1. An engine speed control for a small gas fueled engine comprising an unthrottled air passage to said engine, a readily removable container containing a pressurized source of fuel, conduit means having a readily detachable connection to said container for supplying fuel from said fuel source to said unthrottled air passage of said engine, valves means in said conduit means moveable between an opened position and a closed position, and means for cycling said valve means between its opened and closed positions with a duty cycle that varies to control the amount of fuel supplied to the engine and the speed of said engine without throttling air flow.

2. An engine speed control as set forth in claim 1 wherein the valve means is a solenoid operated valve.

3. An engine speed control as set forth in claim 1 further including pressure regulating means interposed between the source of fuel and the valve means for maintaining a substantially uniform pressure.

4. An engine speed control as set forth in claim 3 wherein the valve means is a solenoid operated valve.

5. An engine speed control as set forth in claim 4 further including means for moving the solenoid valve to a starting position in response to starting of the engine.

6. An engine speed control as set forth in claim 4 further including means for moving said valve means to its closed position when the engine is stopped.

7. An engine speed control as set forth in claim 6 further including means for moving the solenoid valve to a starting position in response to starting of the engine.

8. An engine speed control for a small gas fueled engine as set forth in claim 1 further including means interposed between the means for cycling the valve means and the engine for reducing the amount of fuel supplied to the engine under certain running conditions.

9. An engine speed control for a small gas fueled engine as set forth in claim 8 wherein the means for reducing the amount of fuel reduces the amount of fuel supplied to the engine under low speed condition.

* * * * *